United States Patent [19]

Maeda et al.

[11] Patent Number: 4,580,183
[45] Date of Patent: Apr. 1, 1986

[54] INFORMATION RECORDING AND/OR REPRODUCING APPARATUS

[75] Inventors: Masaya Maeda, Kanagawa; Makoto Fujiki; Tatsuzo Ushiro, both of Tokyo; Takashi Kimura, Kanagawa; Hiroshi Watanabe; Masahide Hasegawa, both of Tokyo, all of Japan

[73] Assignee: Canon Kabushiki Kaisha, Tokyo, Japan

[21] Appl. No.: 434,351

[22] Filed: Oct. 14, 1982

[30] Foreign Application Priority Data

Oct. 23, 1981 [JP] Japan ............................ 56-170331
Oct. 23, 1981 [JP] Japan ............................ 56-170332
Oct. 23, 1981 [JP] Japan ............................ 56-170333
Oct. 23, 1981 [JP] Japan ............................ 56-170334
Oct. 23, 1981 [JP] Japan ............................ 56-170335

[51] Int. Cl.4 .................. G11B 5/008; G11B 15/00; G11B 17/00
[52] U.S. Cl. .................................. 360/94; 360/85
[58] Field of Search ............................ 360/94–95, 360/85; 242/199–200

[56] References Cited

U.S. PATENT DOCUMENTS 4,074,876 2/1978 Gourley ........................ 242/199
4,160,281 7/1979 Sato ........................... 242/199 X Primary Examiner—A. J. Heinz
Attorney, Agent, or Firm—Toren, McGeady, Stanger, Goldberg & Kiel

[57] ABSTRACT

An adapter permits mounting of a large cassette on a information recording and/or reproducing apparatus adapted for recording or reproducing records on a strip like recording medium contained in a small cassette mounted on the apparatus, so that both small and large cassettes can be used on the apparatus with the adapter mounted thereon.

2 Claims, 15 Drawing Figures

INFORMATION RECORDING AND/OR REPRODUCING APPARATUS

BACKGROUND OF THE INVENTION

1. Field of the Invention

This invention relates to an information recording and/or reproducing apparatus adapted for recording or reproducing voices and images on a strip-like recording medium by pulling it out of a cassette which contains the recording medium and more particularly to a cassette adapter which is suited for the apparatus to permit both small and large cassettes to be usable on the apparatus.

2. Description of the Prior Art

Taking cassette type video tape recorders (hereinafter will be called VTRs for short) as an example of the apparatus to which the present invention is applicable, conventional home VTRs can be divided into non-portable and portable types. Generally, the non-portable type home VTR has a tuner and an AC power source and is arranged to mainly record programs broadcast from television broadcasting stations. Meanwhile, the purpose of the portable type home VTR is to take pictures. However, the portable VTR is using the same kind of cassettes as those used for the non-portable VTR. As a result of this, the portability of the conventional VTR is still insufficient.

In view of this, there have been proposed various portable VTR systems which are arranged to use small cassettes containing tapes of small capacity at the sacrifice of the length of recordable time.

This arrangement, however, presents a problem which lies in that it necessitates use of the portable VTR system solely for the purpose of taking pictures in addition to a non-portable type VTR adapted mainly for recording broadcast programs which requires a long time recording function.

Further, if the recording tape of the small cassette to be used for the small-cassette using portable VTR is in a format not interchangeable with that of the large-cassette using non-portable VTR, the tape recorded by the portable VTR cannot be used on the non-portable VTR and necessitates a process of converting to an electrical signal as known by the name of "dubbing". However, a dubbing process is not desirable because it degrades the S/N ratio of records.

SUMMARY OF THE INVENTION

It is a general object of this invention to provide an information recording and/or reproducing apparatus which obviates the problems of the conventional apparatuses with a mounting mechanism for mounting a large cassette on a portable VTR arranged to permit recording or reproduction on the large cassette, so that a function of recording a broadcast program over a long period of time and another function of operating as small, light weighted picture taking system can be both performed, the object also including provision of a cassette adapter to be coupled with the apparatus.

A more specific object of the invention is to provide an information recording and/or reproducing apparatus having an adapter which permits mounting a large cassette on the apparatus adapted for use of small cassette, the apparatus being arranged such that, when the adapter is to be mounted on the apparatus, a portion of a small cassette holder opens.

Another object of the invention is to provide a cassette adapter having second tape extracting means which is arranged to pull out a tape out of the large cassette and is disposed in the operating position of first tape extracting means which is arranged to pull out a tape out of a small cassette.

A further object of the invention is to provide an information recording and/or reproducing apparatus or a cassette adapter having various mechanisms which are arranged to prevent a tape contained within a large cassette from being damaged when the large cassette is used.

These and further objects and features of the invention will become apparent from the following detailed description of preferred embodiments thereof taken in connection with the accompanying drawings.

DETAILED DESCRIPTION OF PREFERRED EMBODIMENT

Figure 1A:
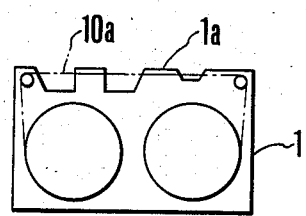
FIG. 1(a) is a plan view of a large cassette and FIG. 1(b) a plan view of a small cassette.
Figure 1B:
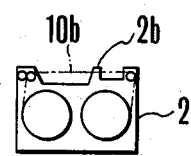
Figure 2A:
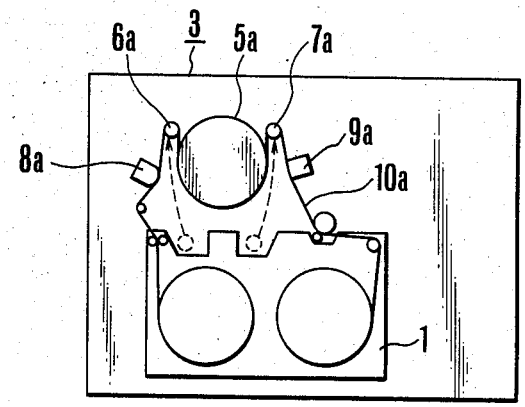
FIG. 2(a) is a plan view of a non-portable VTR and FIG. 2(b) a plan view of a portable VTR.

An embodiment of the invention is arranged as described below:

FIGS. 1(a) and 1(b) are plan views of a large cassette 1 and a small cassette 2 (hereinafter will be called the large cassette and the small cassette respectively). FIG. 2(a) shows a non-portable VTR which is loaded with the large cassette 1 and FIG. 2(b) a portable VTR which is loaded with the small cassette 2. The non-portable VTR 3 contains a tuner and an AC-DC converter which is not shown but is arranged to converts a supply voltage from an AC power source into a direct current.

When each of the large and small cassettes 1 and 2 is in an operating state as shown in FIGS. 1 and 2, a tape 10a or 10b is pulled out of the cassette 1 or 2 through an extraction guide and is connected at a predetermined angle to a cylindrical tape guide (or a drum) 5a or 5b which contains a rotary magnetic head and is of the same diameter as that of the other. A video signal or the like is recorded or played back under this condition. As apparent from FIG. 2, the large and small cassettes 1 and 2 differ from each other in the shape of openings provided in the front sides 1a and 2b. Although the recording formats of the tapes 10a and 10b are identical with each other to render the tapes interchangeable with each other, the large and small cassettes are not interchangeable because of the difference in the shape of the openings provided in the cassette front sides 1a and 2b.

Figure 2B:
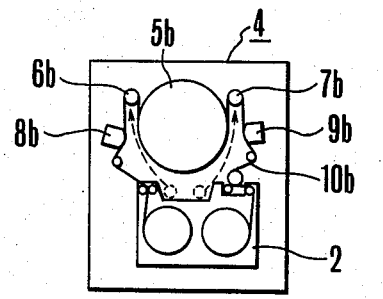

The main component of the video system according to this particular embodiment of the invention is a portable VTR 4 which is arranged to use the small cassette 2 shown in FIG. 2(b). The portable VTR 4 is smaller and lighter than the conventional portable type VTR using the large cassette. Use of this portable VTR in combination with a video camera gives a video system suitable for taking pictures outdoors.

Further, the portable VTR 4 which is arranged to use the small cassette 2 is provided with an adapter for mounting the large cassette 1 on the portable VTR 4. With the portable VTR 4 combined with the adapter, the large cassette of a long recording capacity can be used to permit the portable VTR 4 to perform the same function as that of the conventional non-portable VTR.

Figure 3A:
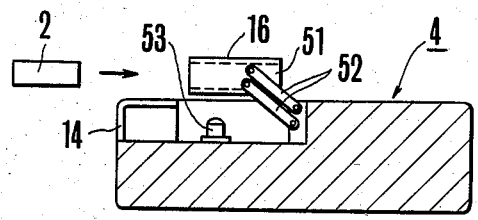
FIGS. 3(a) and (b) are schematic views showing the portable VTR as in a state of being loaded with a small cassette.
Figure 3B:
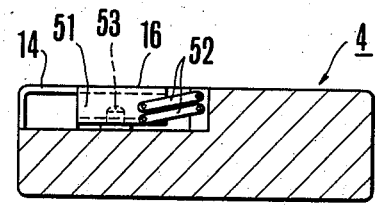

The portable VTR 4 is loaded with the small cassette 2 in such a manner as shown in FIGS. 3(a) and 3(b), which show a state before loading and a state after loading respectively. Referring to FIG. 3(a) and (b), the VTR 4 is provided with a pocket cover 14 which is removable; a holder 51 which holds the small cassette; a removable holder cover 16; and a support lever 52 which is arranged to support the cassette holder 51 and is urged to move upward as viewed on the drawings by a spring. When the holder cover 16 is manually depressed with the cassette 2 inserted into the holder 51, the reel bearing of the small cassette 2 is brought into fitted engagement with a reel shaft 53 of the VTR body and is locked in that state.

Figure 4:
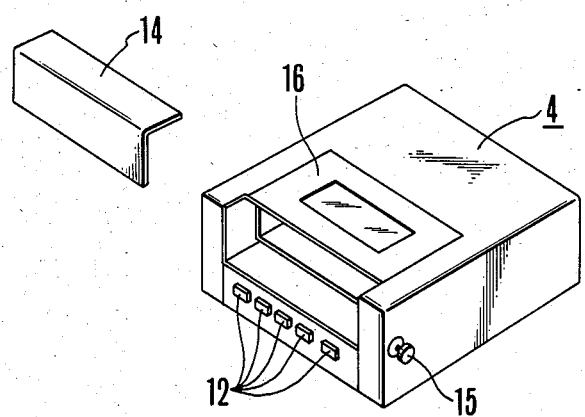
FIG. 4 is an oblique view showing the portable VTR as in a state of having a pocket cover 14 thereof removed.
Figure 5:
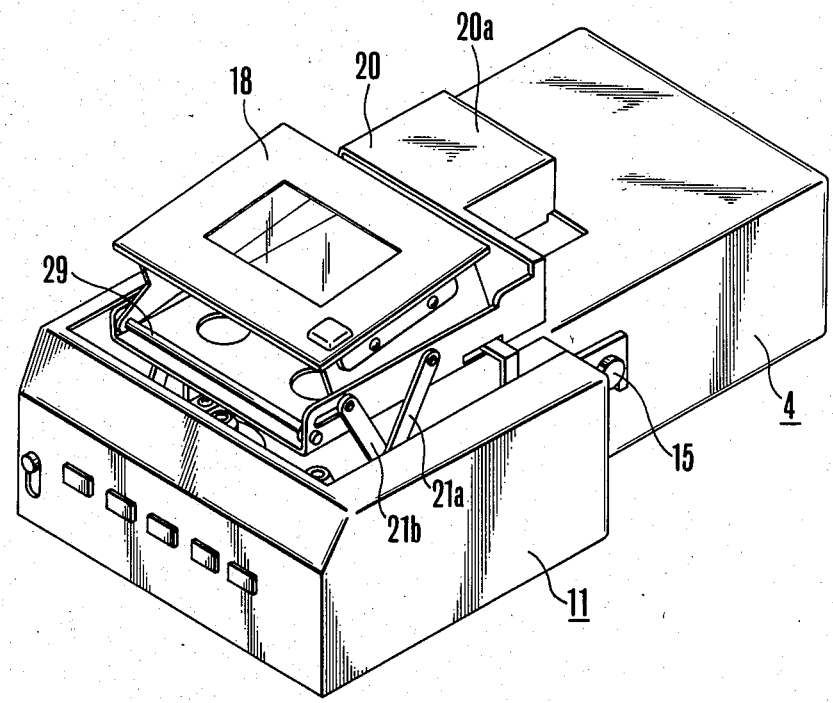
FIG. 5 is an oblique view showing the portable VTR as in a state of having a cassette adapter 11 coupled therewith.
Figure 6:
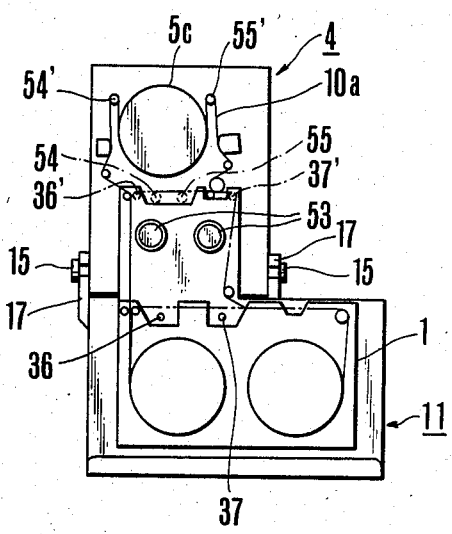
FIG. 6 is a plan view showing the portable VTR as in a state of being coupled with a large cassette adapter 11.
Figure 7:
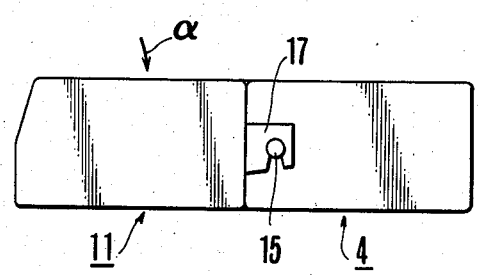
FIG. 7 is a side view of the coupled state shown in FIG. 6.

FIG. 4 shows the portable VTR 4 in a state in which the cover 14 (hereinafter will be called the pocket cover) arranged to cover an opening provided for a large cassette adapter is removed. FIG. 5 is an oblique view showing the portable VTR 4 as in a state of being coupled with a cassette adapter 11. FIG. 6 is a plan view showing the portable VTR 4 as in a state of being coupled with a large cassette adapter 11. FIG. 7 is a side view of the state shown in FIG. 6. The portable VTR 4 is provided with strap attaching pins 15 which are disposed on both sides of the portable VTR 4. The body of the adapter 11 is provided with two connecting metal fittings 17 which are arranged into a U-shape to pinch these strap attaching pins 15. In coupling the VTR 4 with the adapter 11, the pocket cover 14 and the holder cover 16 for the small cassette 2 are removed and the strap attaching pins 15 are inserted into the U-shaped parts of the connecting metal fittings 17 while the cassette adapter 11 is moved in the direction of arrow a as shown in FIG. 7. With the portable VTR 4 arranged to open at least a portion of an enclosure encompassing the fitting part for the small cassette 2 as described above, a mounting mechanism (the cassette adapter 11) for the large cassette can be mounted on the VTR which is arranged to use the small cassette. Further, the above described arrangement of this embodiment to remove the portion of the enclosure may be replaced with another arrangement to slide the portion of the enclosure to obtain the required opening. Further, electrical coupling required in this instance is arranged to be accomplished by means of remote control terminals which are not shown. The electrical coupling also may be accomplished by other means such as the hot shoe contact of a camera because the portable VTR 4 and the cassette adapter 11 are mechanically coupled with each other.

Figure 8:
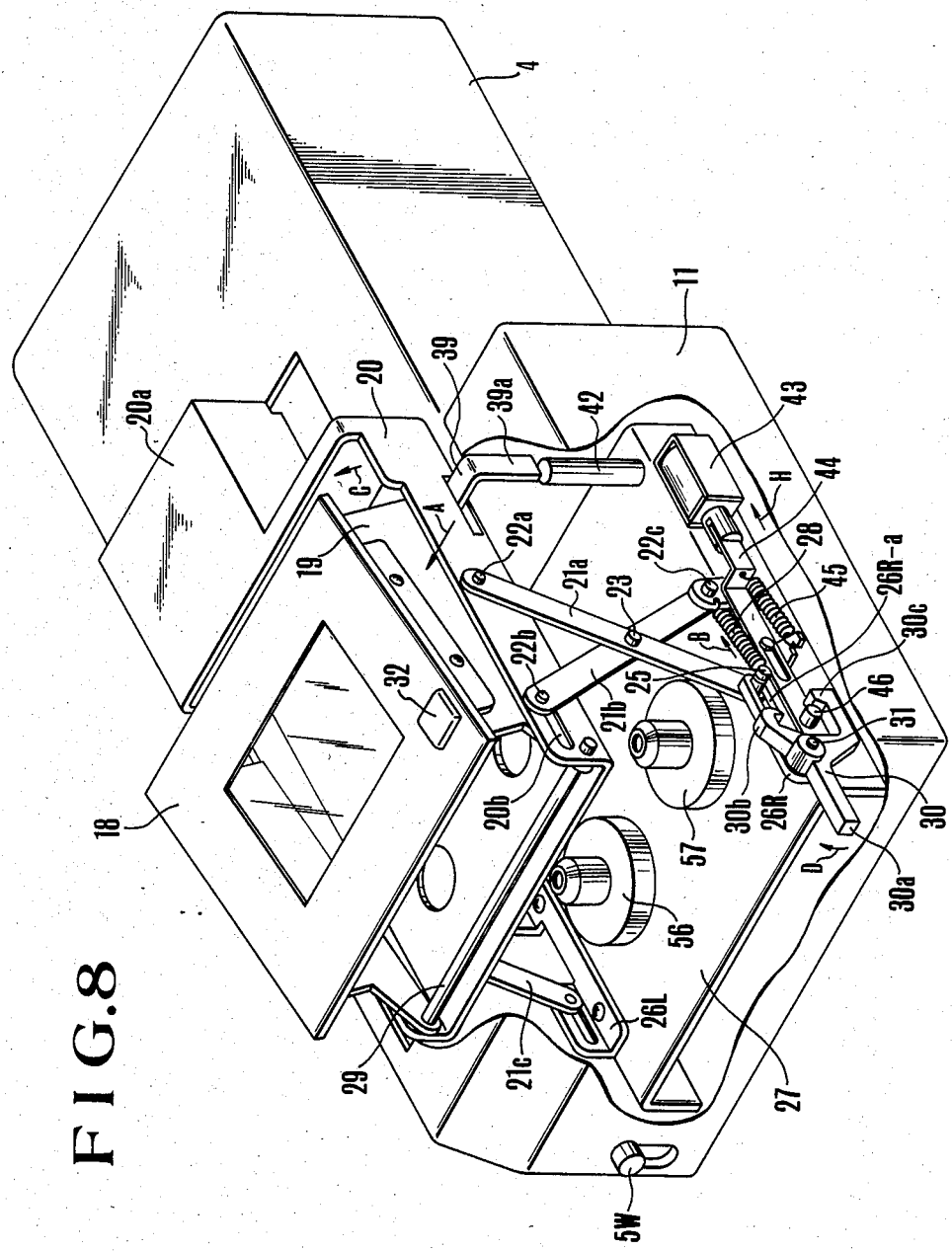
FIG. 8 is a partially cutaway view of FIG. 5.

The structural arrangement and the operation of the cassette adapter 11 will be understood from the following description:

Before loading the large cassette, the cassette adapter 11 is in a state as shown in FIG. 8. A lifting base plate 20 is arranged to be movable up and down relative to a chassis 27 which is provided within the cassette adapter 11. The up and down movement of the lifting base plate 20 is allowed by a link mechanism consisting of links 21a, 21b, 21c and 21d (not shown), rotating fulcrums 22 and 23 and spring loaded slide members 25. Further, the lifting base plate 20 is constantly urged upward by the pulling force of coiled springs 28 exerted in the direction of arrow B. Round a shaft 29 which is supported by one end of the base plate 20 is attached a cassette holder 19 which is urge by a spring (not shown) to rotate toward (in the direction of arrow C) a position in which allowing the cassette is allowed to be taken out. An eject lever 30 is urged by a spring which is not shown to rotate on a shaft 31 in the direction of arrow D. The eject lever 30 is provided with a protrudent part 30a which protrude from one end of the lever 30 to serve as an operating member.

Figure 9A:
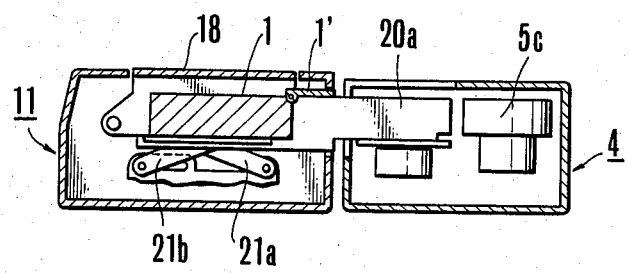
FIG. 9(a) is a sectional view showing a lifting base plate for a large cassette as in a state of having the large cassette attached to the VTR.

Under the condition in which the cassette adapter 11 and the portable VTR 4 are being coupled with each other, the lifting base plate 20 is in a lower position as shown in FIG. 9(a). The slide member 25 is arranged to slide within a slot 26R-a provided in a link mechanism support plate 26R. Under the above stated coupled condition, the slide member 25 is locked by a hook part 30b of the eject lever 30. Since the slide member 25 is thus prevented from moving by the hook part 30b of the eject lever 30 under the coupled condition, the base plate 20 is kept in the lower position thereof.

Figure 9B:
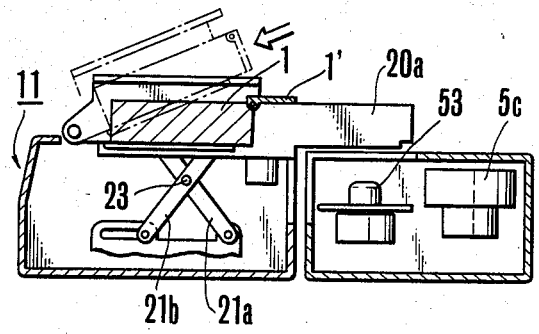
FIG. 9(b) is a sectional view showing the lifting base plate for the large cassette as in a state prior to loading the VTR with the large cassette.

Next, when the operating part of the eject lever 30 is moved downward (in the direction opposite to the direction of arrow D) against the urging force exerted in the direction of arrow D, the hook part 30b turns upward on the shaft 31 in the direction of unlocking. Then, the slide member 25 is unlocked and is caused to move by a pulling force of a spring 28 in the direction of arrow B as shown in FIG. 8. The links 21a, 21b, 21c and 21d respectively turn to move the base plate 20 upward. The slide member 25 comes to abut on the other end of the slot 26R-a to be fixed there. The lifting base plate 20 is provided with a small cassette shaped part 20a which is formed in a shape identical with the shape of the small cassette 2. When the lifting base plate 20 is in an upper position, this small cassette shaped part is located above the upper surface of the portable VTR body 4 as shown in FIG. 9(b).

Figure 10:
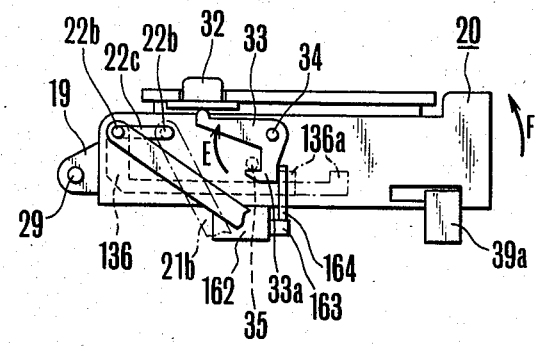
FIG. 10 is an illustration of the structural arrangement of the lifting base plate.

FIG. 10 shows the cassette holder 19 and the lifting base plate 20 as viewed from the direction of arrow A shown in FIG. 8. Referring to FIG. 10, there is provided a pop-up button 32 which is provided for causing the cassette holder to pop-up to permit loading the portable VTR with the large cassette 1. A lock lever 33 is arranged to rotate on a fulcrum shaft 34 disposed on the cassette holder 19. The lock lever 33 is urged by a spring which is not shown to rotate clockwise (or in the direction of arrow E) as shown in FIG. 10. A pin 35 is erected on the inner side of the lifting base plate 20. When the cassette holder 19 is depressed, a hook part 33a which is formed at the fore end of the lock lever 33 comes to engage the pin 35 at the depressed position. With the hook part 33a engaged with the pin 35, the cassette holder 19 is kept in a cassette loading position against an urging force urging it to rotate in the direction for taking out the cassette (or in the direction of arrow F).

One of the links, i.e. the link 21b, of the link mechanism is provided with a lock release inhibiting slide plate 136 which is rotatably arranged at one end of the slide fulcrum shaft 22b of the link 21b to inhibit the lock lever 33 from unlocking. This slide plate 136 is interlocked with the slide fulcrum shaft 22b on the inner side of the side plate of the lifting base plate 20 together with the link 21b and is arranged to move within a sliding groove 20b.

When the pop-up button (hereinafter will be called the UP button) is pushed under a condition that the lifting base plate 20 is in its upper position and the tape is not pulled out of the cassette, the lock lever 33 rotates counterclockwise on the fulcrum shaft 34. This disengages the above stated hook part 33a and the pin 35 from each other. The spring which is not shown causes the cassette holder 19 to rotate counterclockwise on the shaft 29 to bring about the condition as shown in FIG. 8.

The cover 1' of the large cassette 1 which is arranged to cover the front opening of the large cassette 1 is opened. The large cassette 1 is then loaded on the cassette holder 19 and is pushed downward together with the cassette holder 19. Then, the large cassette 1 moves from a position as shown by a one-dot chain line in FIG. 9(b) to another position shown by a full line. Upon completion of this movement, the lock lever 33 locks the pin 35.

Figure 11:
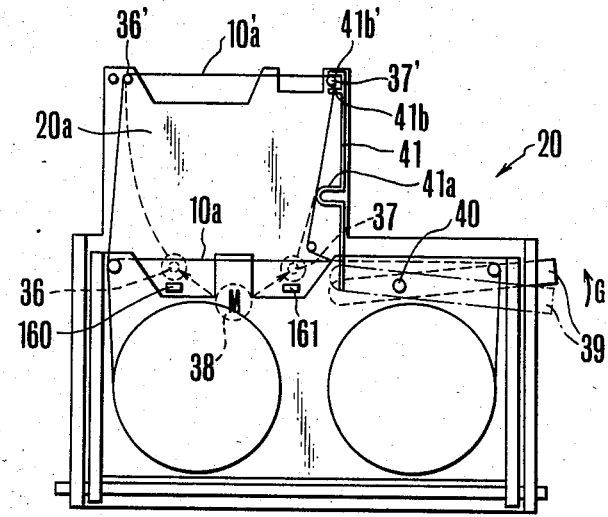
FIG. 11 is an illustration showing a tape as in a state of being extracted within the adapter.

When the above stated movement is completed, pull out pins 36 and 37 provided within the cassette for tape loading come to the inner side of the tape 10a of the large cassette 1 (see FIG. 11). The pull-out pins 36 and 37 provided within the cassette are driven by a loading motor 38 which is disposed within the adapter in the lower part of the lifting base plate 20 and is arranged to operate in response to the operation of a switch SW shown in FIG. 8. With the pins 36 and 37 driven in this manner, the tape 10a is pulled out as they move toward the small cassette shaped part 20a which is mentioned in the foregoing.

Referring to FIG. 11, the pull-out pins 36 and 37 within the cassette are then moved to positions 36' and 37' respectively as shown in FIG. 11. The tape T which is thus pulled out is stretched in a position corresponding to the tape unloading position of the small cassette 2 in relation to the above stated shaped part 20a. In other words, the pull-out pins 36 and 37 are moved to the positions 36' and 37' to form a loop in conjunction with a tape portion 10'a and the large cassette. Again referring to FIG. 6, the tape 10a comes in between the cylinder 5c and the pull-out pins 54 and 55 which are provided for loading the tape on the cylinder 5c. In other words, the pins 54 and 55 are also located within the above stated loop. Under this condition, the cassette holder 19 is arranged not to pop-up when the PU button 32 is depressed. This arrangement is as described below:

There are provided micro switches 160 and 161 which are arranged as shown in FIG. 11 to detect whether the pull-out pins 36 and 37 are located at the opening part of the large cassette or not. When the switches 160 and 161 detect that the pins 36 and 37 are not in their positions 36 and 37, the detection outputs of these switches 160 and 161 cause a power supply to an eject lock plunger 162 (see FIG. 10). With the power supply thus effected to the eject lock plunger 162, a movable iron core 163 moves leftward as viewed on FIG. 10 against the force of a return spring which is not shown in the same manner as the slide plate 136 mentioned in the foregoing. Then, a locking pin 164 provided on the movable iron core 163 prevents the rotation of the lock lever 33. When the switches 160 and 161 detect that the pull-out pins 36 and 37 are in their positions 36 and 37, the power supply to the plunger 162 is cut off by the switches 160 and 161. Then, the locking pin 164 moves to the right to permit the lock lever 33 to rotate. Accordingly, when the pull-out pins 36 and 37 are not in the positions 36 and 37 as shown in FIG. 11, the ejection of the large cassette by means of the PU button 32 is inhibited to prevent the tape from being damaged.

Further, a lifting base plate lock lever 39 is provided at the lower part of the lifting base plate 20. The lock lever 39 is arranged to be rotatable on a fulcrum 40 and is urged by an urging spring member which is not shown to rotate counterclockwise (or in the direction of arrow G). One end of the lock lever 39 extends to the outside of the lifting base plate 20 and is formed into a bent part 39a which is bent downward. When the pull-out pins 36 and 37 are not in the positions 36' and 37', this bent part 39a of the lock lever 39 is opposed to a stud 42 which is erected on the base plate 27 of the adapter 11 shown in FIG. 8 in such a way as to inhibit the lifting base plate 20 from being pushed downward. Meanwhile, the other end of the lock lever 39 is connected to an interlocking wire 41 which is provided with a U-shaped buffer part 41a as shown in FIG. 11. A bent part 41b of the interlocking wire 41 moves to a position 41b' as a result of the movement of the pull-out pin 37 in the cassette to the position 37'. This move of the interlocking wire 41 pulls the other end of the lock lever 39 upward as viewed on FIG. 11 against the force of the above stated spring member. This causes the lock lever 39 to turn clockwise until it comes to a position indicated by a one-dot chain line in FIG. 11. Therefore, the bent part 39a moves away from the stud 42 which has been preventing the whole lifting base plate 20 from being depressed, so that the lifting base plate 20 now becomes depressible. In response to an extracting action from the large cassette, the lifting base plate 20 moves relative to pull-out means for extracting the magnetic tape which is a recording medium to a position where the pull-out mechanism can be enabled to operate in conjunction with the large cassette. The lifting base plate 20 is not only arranged to prevent the recording medium contained in the large cassette from being damaged but also arranged to permit use of both the small cassette and the large cassette.

With the lifting base plate 20 depressed, the hook part 30a of the eject lever 30 engages the spring loaded slide member 25 to lock the whole lifting base plate 20 by locking the slide member 25 as described in the foregoing. In that instance, the tape 10 which is pulled out of the large cassette 1 is inserted in between the drum or cylinder 5c and the pull-out pin opposed thereto in the same manner as when the portable VTR is loaded with the small cassette 2. At that time, the tape pull-out pins 36' and 37' within the adapter serve as guide pins for positioning the tape at the beginning of loading the tape onto the drum 5c. Further, with the portable VTR 4 set in a desired mode such as a recording mode or a reproducing mode, a loading operation proceeds to bring the tape 10a to the drum 5c disposed within the portable VTR 4. Then, when known detecting means provided within the portable VTR 4 for detecting an unloaded condition detects that the VTR is not in an unloading condition but it is in process of a loading operation or in a loaded state, the eject lock plunger 43 which inhibits the upward movement of the lifting base plate 20 as shown in FIG. 8 is actuated. Then, the eject lock slide plate 44 which is connected to the plunger 43 is slided in the direction of arrow H against the force of the return spring 45. This brings the pin 46 erected on the slide plate 44 to a position above the protrudent part 30c of the eject lever 30 (see FIG. 8). Therefore, with the tape 10a pulled into the portable VTR 4, the lifting base plate 20 is inhibited from being ejected even when the eject lever 30 is pushed down under this condition.

Further, even if the PU button 32 is pushed down under this condition, the cassette holder 19 does not popup because the unlock inhibiting slide plate 136 has been positioned at the part indicated by a one-dot chain line in FIG. 10 as a result of the sliding movement of the lifting base plate support link 21b and because this causes the rotation of the lock lever 33 to be prevented by the L-shaped part 136a of the above stated slide plate 136. Since the large cassette is thus protected from being ejected even by an inadvertent depressing operation on the PU button 32, the tape portion 10a pulled out to the inside of the above stated shaped part 30a is never damaged.

The operation of the portable VTR 4 after the tape has been pulled out to the inside of the VTR 4 is identical with the operation of the conventional VTR. Therefore, the further operation of the VTR 4 is omitted from the description given herein.

Further, the portable VTR 4 can be further reduced in size and weight if it is arranged to perform recording only.

In using first and second cassettes of differnet sizes and configurations as described above, the invention provides first pull-out means for extracting a strip like recording medium out of the first cassette while, for the second cassette, second pull-out means for extracting a strip like recording medium out of the second cassette is arranged in a position where the first pull-out means can be allowed to operate. The arrangement according to the invention permits simplification of the structural arrangement required around a magnetic head which is employed as converting means for recording information or reproduction of recorded information.

The embodiment does not required any accessories for loading it with the small cassette. Besides, it can be loaded with the large cassette whenever the use of the large cassette is desired except when the small cassette is in use. Therefore, the VTR according to the invention excels in portability for an outdoor recording operation when the small cassette is used and yet permits an indoor recording or reproducing operation when the large cassette is used, so that requirements for diversified usages can be satisfied by the invention.

While a preferred embodiment has been described, variations thereto will occur to those skilled in the art within the scope of the present inventive concepts which are delineated by the following claims.

What we claim:

1. An information recording and/or reproducing system for use with tape-shaped recording media respectively housed in a first cassette and a second cassette, said second cassette being larger than the first cassette in size, said system comprising in combination:
   (1) an information recording and/or reproducing apparatus comprising:
      (A) a first chamber for accommodating the first cassette;
      (B) recording and/or reproducing means for recording information on and/or reproducing recorded information from the recording medium; and
      (C) first movable means movable from first to second positions for extracting the recording medium from the first cassette and for moving same into a position adjacent the recording and/or reproducing means to allow transducing of signals to or from the medium; and
   (2) an adapter comprising:
      (D) a second chamber for accommodating the second cassette;
      (E) a third chamber adapted to be substantially insertable in said first chamber of said apparatus wherein said third chamber is in physical communication with said second chamber of said adapter;
      (F) second movable means movable from third to fourth positions for extracting the recording medium from the second cassette and for placing the medium at a predetermined position within said third chamber to relay the medium from the second cassette to said first movable means in the apparatus at said first position of the first movable means.

2. An information recording and/or reproducing system for use with tape-shaped recording media respectively housed in a first cassette and a second cassette which is larger in size than the first cassette, said system comprising:
   (1) an information recording and/or reproducing apparatus comprising:
      (A) means forming a first chamber for accommodating the first cassette;
      (B) recording and/or reproducing means for recording information on and/or reproducing recorded information from the recording medium;
      (C) first movable means movable from first to second positions for extracting the recording medium from the first cassette and for moving the medium into a position relative to the recording and/or reproducing means to allow transducing of signals to or from the medium; and
   (2) an adapter comprising:
      (D) means forming a second chamber for accommodating the second cassette;
      (E) means forming a third chamber engageable with said first chamber of said apparatus and in physical communication with said second chamber of said adapter; and
      (F) second movable means movable from third to fourth position for extracting the recording medium from the second cassette and for pacing the medium at a predetermined position within said third chamber to relay the medium from the second cassette to said first movable means in the apparatus at said first position of the first movable means.

* * * * *